Figure 1:
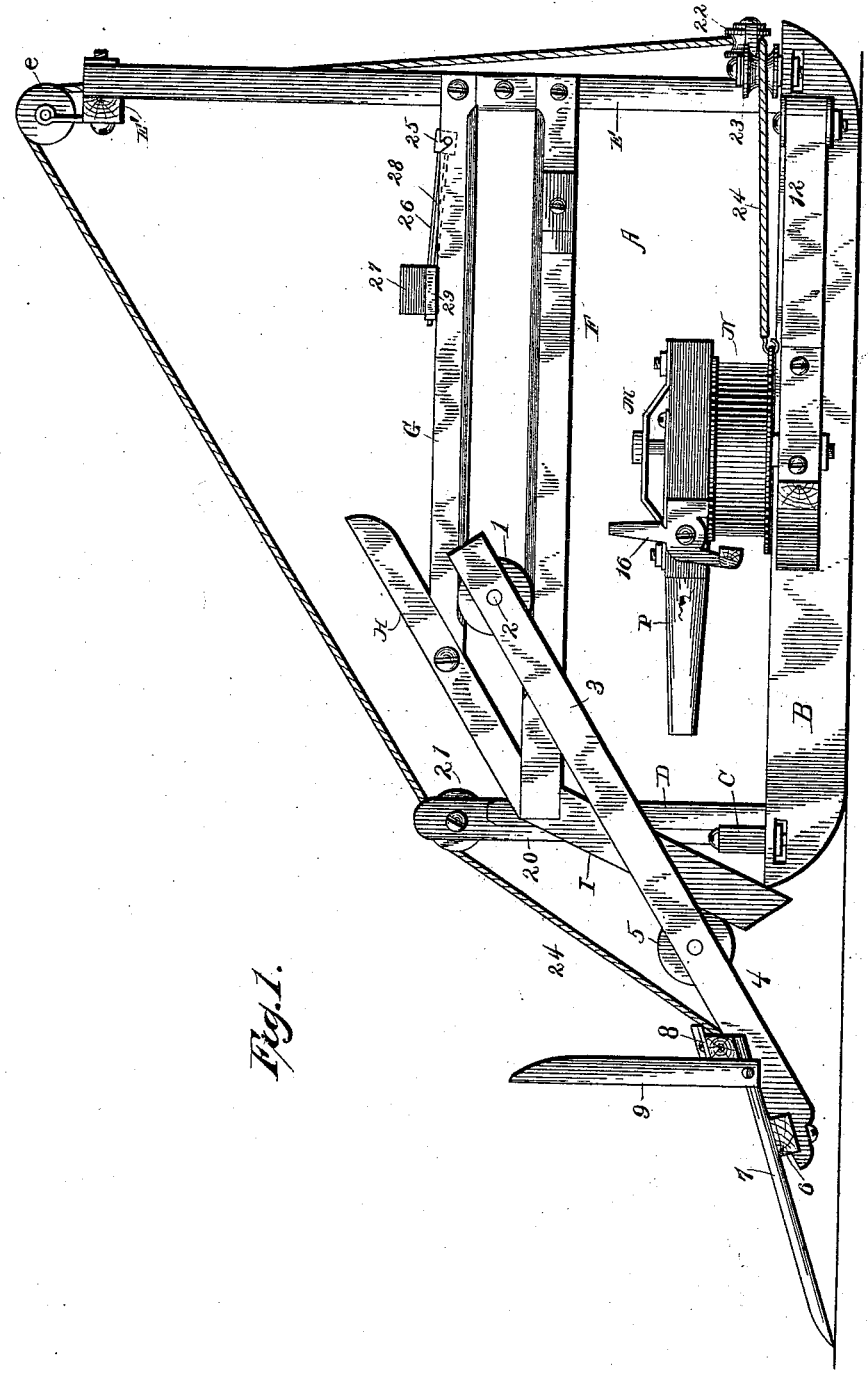

(No Model.)

M. M. BURTON.
HAY RICKER.

No. 510,628.  Patented Dec. 12, 1893.

2 Sheets—Sheet 1.

Witnesses
C. S. Frye
E. L. Julihn

M. M. Burton
Inventor
By Hopkins & Atkins
Attorneys

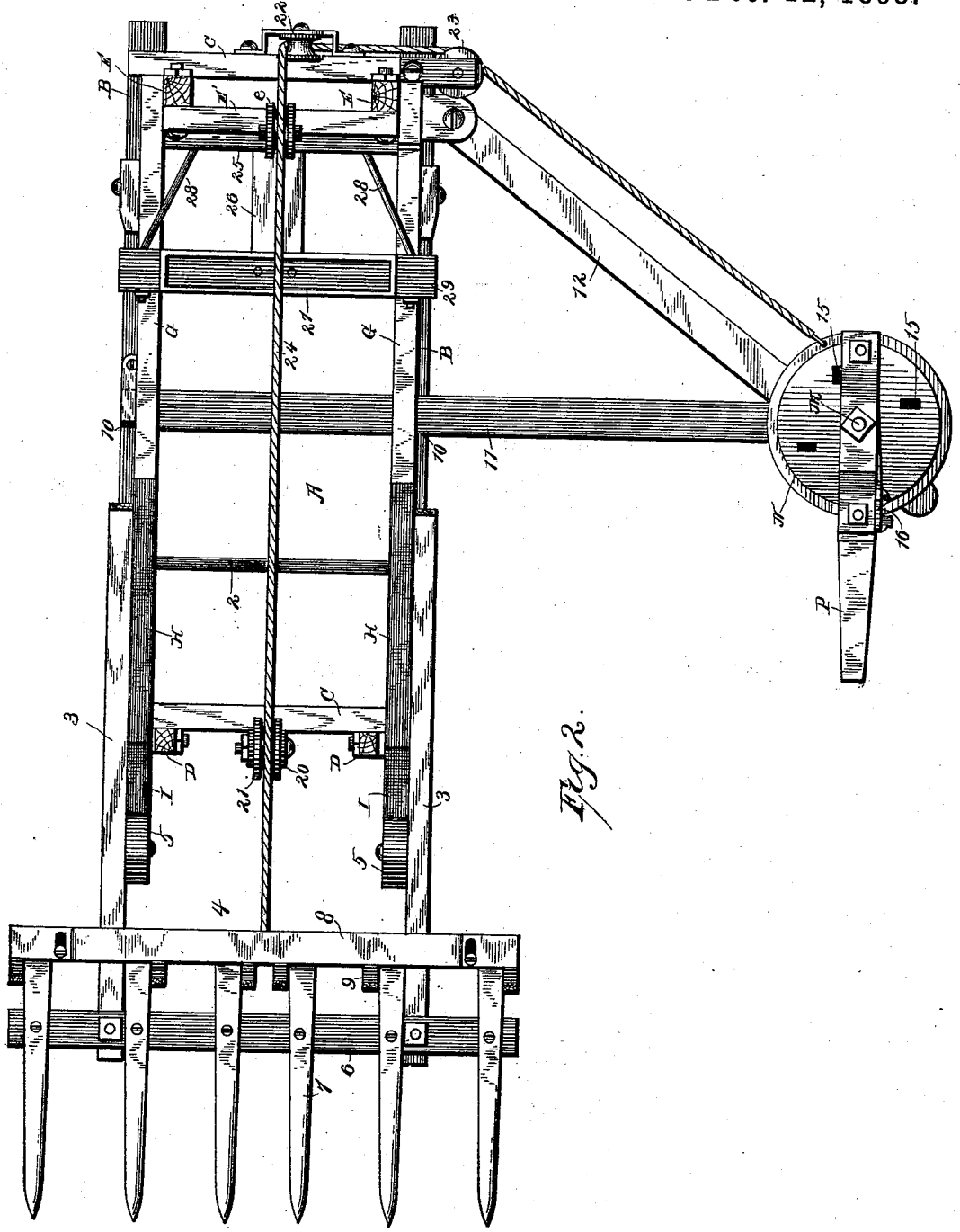

UNITED STATES PATENT OFFICE.

MASON M. BURTON, OF NORTH SALEM, MISSOURI.

HAY-RICKER.

SPECIFICATION forming part of Letters Patent No. 510,628, dated December 12, 1893.

Application filed December 9, 1892. Serial No. 454,637. (No model.)

*To all whom it may concern:*

Be it known that I, MASON M. BURTON, a citizen of the United States, residing at North Salem, in the county of Linn and State of Missouri, have invented certain new and useful Improvements in Hay-Rickers; and I do hereby declare the following to be a full, clear, and exact description of the invention, such as will enable others skilled in the art to which it appertains to make and use the same.

My invention has relation to improvements in hay rickers, and its novelty will be fully understood from the following description and claims when taken in conjunction with the accompanying drawings, in which—

Figure 1 is a side elevation of my improved hay ricker, and Fig. 2 is a top plan view of the same.

In the said drawings, similar letters and figures designate corresponding parts in both the views, referring to which—

A, indicates the main frame of my improved machine, which, preferably, comprises the longitudinal base bars B, the transverse connecting beams C, the short uprights D, rising from the forward cross-beam, the long uprights E, rising from the rear cross-beam, the cross-bar E', connecting said uprights, and the longitudinal bars F, connecting the forward and rear uprights; but, as is obvious, I do not desire to be confined to this construction, as any suitable frame might be employed. Connected at their rear ends to the uprights E, are longitudinal bars G, which extend forwardly to a point adjacent to the front end of the machine, where they are rigidly connected with the inwardly-directed oblique bars H, at an intermediate point in the length thereof. These oblique bars H, are connected to the forward end of the frame, where they merge into the depending oblique bars, I, in conjunction with which they serve as a track for a purpose presently set forth.

As better illustrated in Fig. 1 of the drawings, the upper edge of the longitudinal bars F, and the lower edge of the longitudinal bars G, of the frame A, are ridged to prevent the casual displacement of the anti-friction rollers, 1, which are provided with transverse apertures to receive the transverse bolt, 2, which serves to connect the parallel arms, 3, of the elevating fork, 4, which arms are provided with friction wheels 5, to travel upon the track-beams H, I, and are connected at their forward ends to a transverse beam 6, upon which is fixed the longitudinally-disposed teeth 7. Fixedly connected to the arms 3, of the elevating fork, adjacent to the rear ends of the teeth 7, is a transverse bar 8, which serves to limit the backward movement of the teeth 9, which are pivotally connected to the teeth 7, adjacent to the rear ends thereof and normally rest in a plane at right angles to said teeth 7, thus providing a construction of fork adapted to receive and hold a large quantity of hay, or the like.

The longitudinal base bars B, of the main frame A, are provided in their upper edges with aligned slots 10, in which is seated and detachably secured a transverse bar 11, which extends laterally from the side of the main frame and has its outer end connected to the frame and braced by the brace bar 12, as shown. This brace bar 12, is provided, adjacent to its outer end, with transverse bolt-holes to receive the bolts for connecting the bearing of the vertical shaft M. The loosely mounted drum or windlass N, upon the shaft M, is provided in its upper side at circular intervals with notches or depressions 15, for the engagement of a spring-backed lever 16, which is fulcrumed upon the side of the sweep P, which is fixedly connected to the shaft M.

By this construction it will be readily perceived that when it is desired to lower the elevating fork without backing the draft team, the attendant simply disengages the lever on the sweep from the depressions in the drum, when said drum may be readily revolved for a purpose presently pointed out.

An upright 20, carrying a friction wheel 21, at its upper end, is connected to the lower and upper forward transverse bars of the frame; and connected at one end to the elevating fork, as shown; and taking over the friction wheel 21, on the upright 20, over the wheel e, on the cross-bar at the upper end of the uprights E, under a friction wheel 22, at the rear of the frame, and around a friction wheel 23, at the side of said frame is a rope 24, which is connected at its opposite end to the periphery of the drum N; by reason of which construction it will be perceived that when the drum is rotated through the medium of the sweep, before described, the elevating fork will be carried to the rear of the frame and be raised into a perpendicular position.

Connected to a transverse rock bar 25, journaled in the upper edge of the longitudinal bars G, is a forwardly-extending bar 26, upon which is mounted a weight box 27, which serves in practice to return the elevating fork to its normal position, as will be presently described. Also connected to the rock bar 25, are the arms 28, which extend at approximate acute angles with respect to the bar 26, and are connected at their forward ends by a transverse bar 29, which is connected by rods to the weight box 27, and is designed to be engaged by the parallel arms of the fork when the said fork is elevated, whereby the weight box will be elevated with the fork, and when the drum N, is made loose upon its shaft, said weight box will facilitate the return of the fork to its normal position.

The operation of my improved machine is as follows: The fork being in the position shown upon the ground, it may be charged or loaded in any suitable manner. After the fork has been loaded, the draft team is started and, through the medium of the drum and the rope described, said fork is carried toward the rear of the frame and is raised into a perpendicular position, when its load may be readily removed. The weight box, having been raised with the fork, serves to facilitate its return to its normal position, when the drum or windlass has been rendered loose upon the shaft, as described.

Although I have specifically described the construction and relative arrangement of the several elements of my improved machine, yet I do not desire to be confined to such precise construction, &c., as such modifications may be made in practice as fairly fall within the scope of my invention.

Having thus described my invention, what I claim, and desire to secure by Letters Patent, is—

1. In a hay ricker, the combination with a frame, and parallel horizontal tracks, of angular tracks, consisting of inclined depending bars and upwardly and rearwardly inclined bars at the ends of the lower horizontal tracks, said upwardly inclined bars being supported by the upper horizontal tracks, substantially as specified.

2. In a hay ricker the combination with the frame, and a fork adapted to be raised and lowered, of means for raising said fork and an auxiliary weight adapted to facilitate the lowering thereof to a horizontal position and means for preventing the further movement of the weight after the fork has reached a horizontal position, substantially as specified.

3. In a hay ricker, substantially as described, the combination with the main frame, the elevating fork and a suitable means for raising said fork; of the transverse shaft mounted in bearings on the main frame, the weight box connected to said shaft, the bars connected to the transverse shaft, and the transverse bar connecting the outer ends of said bars and adapted to be engaged by the arms of the forks, substantially as set forth.

In testimony whereof I affix my signature in presence of two witnesses.

MASON M. BURTON.

Witnesses:
JOHN H. STUFFLEBEAN,
MILLARD HALL.